June 26, 1956     F. HILLSON     2,751,681
MITER GUIDE
Filed May 27, 1955

INVENTOR
FRANK HILLSON
BY
Sheldon W. Wikoff
ATTORNEY

United States Patent Office 2,751,681
Patented June 26, 1956

2,751,681

MITER GUIDE

Frank Hillson, Irvington, N. J.

Application May 27, 1955, Serial No. 511,611

6 Claims. (Cl. 30—229)

This invention relates generally to guides and more particularly to guides adaptable for use with cutting tools of the type utilized in the mitering of metal sections.

In the art of metal working, it often is necessary to cut and/or notch moulding and other shaped metal sections so that they may be bent around corners of furniture, cabinetry, walls and the like. Tools are available in the prior art which are designed to facilitate the operation of adapting such shaped metal sections to correspond to and closely fit the contours of the surfaces to which they are applied.

Some of these tools, such as the one disclosed in United States Patent No. 2,595,841, granted to L. P. Glick et al. on May 7, 1953, particularly are adaptable for cutting the upper and lower flanges of channel type moulding at selected angles so that the cut edges of the moulding may be joined together in a miter joint to fit the corners of the material upon which the moulding is placed.

If the angular cuts in the upper and lower flanges of the channel moulding are not in exact vertical alignment, however, the flanges will not properly fit together thereby causing the corners of the miter joint to twist out of shape and the moulding to be unsuitable for its intended purpose.

Priorly taught methods for aligning the upper and lower cuts in such channel members have not proved entirely satisfactory as generally they are time consuming and often inaccurate. For example, it has been suggested that the top and bottom cuts may be kept in alignment if a line is drawn on the intermediate member of the channel moulding at the points where the apices of the angular cuts on the flanges are desired. Thus, a first cut is taken on one of the flanges at the point marked by the line and then the finishing cut is taken on the other flange at the point marked by the other end of the line. Manifestly, due to the difficulties inherent in marking the vertical member with a line at exact right angles to the flanges and cutting the flanges at the precise points determined by the line, this method has not been a completely reliable one.

Other less time-consuming methods of aligning the cuts which have been employed in the prior art, such as attempting to line up the cuts with the eye or with the cutting tool itself also have proved to be unsatisfactory due to the nonuniform results frequently obtained thereby.

Therefore, it is an object of this invention to provide a guide adaptable for use with cutting tools for channel type metal sections which insures the exact vertical alignment of the upper and lower cuts.

It is a further object of this invention to provide a miter guide which is easily and quickly adapted to such cutting tools.

It is a still further object of this invention to provide such a miter guide which is lightweight and which is relatively simple and economical to manufacture.

These and other objects are realized in a specific illustrative embodiment of this invention in which a miter guide is made adaptable to a mitering tool and is relatively easily attached to or removed from the tool. Advantageously, the miter guide comprises a base member having means therein for permitting the guide to be attached to the mitering tool, and a plurality of upright guide members connected to the base and positioned relative to each other at an angle corresponding to the form of the desired cut. In cutting a triangular notch in channel type moulding, for example, the miter guide advantageously first is attached to a miter tool above the cutting edges of the tool. The upper flange of the moulding is cut first, the guide being inactive during this step. When the tool is positioned to effect a cut on the bottom flange, the miter guide is fitted within the cut made on the upper flange so the upright guide members are in conformity with the edges of the cut. This accurately locates the miter tool at a position on the lower flange of the moulding which is in exact vertical alignment with the cut on the upper flange. The bottom cut then may be made.

In accordance with a feature of this invention, a guide is attached to a metal cutting tool of the type utilized in cutting the flanges of channel type moulding. More specifically, it is a feature of this invention to provide such a guide to enable cuts in the top and bottom flanges of channel type moulding to be made with precision and in exact vertical alignment.

It is a further feature of this invention to provide a guide for aligning cuts in metal sections which comprises a member having sides conforming to the shape of said cuts.

It is a still further feature of this invention that such a guide be relatively simple and economical to manufacture.

A complete understanding of this invention, together with the above-noted and other features thereof, may be gained from consideration of the following detailed description and the accompanying drawing, in which.

Figure 4:
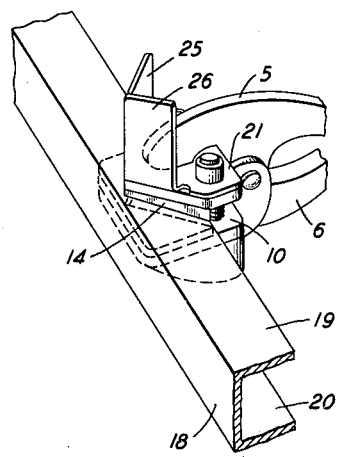
Figure 5:
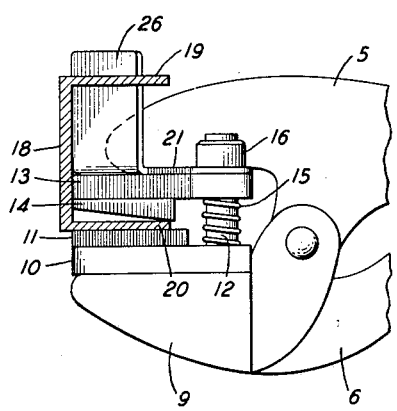

Fig. 4 is a perspective view of a cutting tool with a guide in accordance with the invention attached thereto in position for cutting a flange of a shaped metal section; and Fig. 5 is an elevational view of the front portion of a metal cutting tool with a guide in accordance with the invention attached thereto and fitted in a cut in the upper flange of a shaped metal section for aligning a cut in the lower flange thereof.

Figure 1:
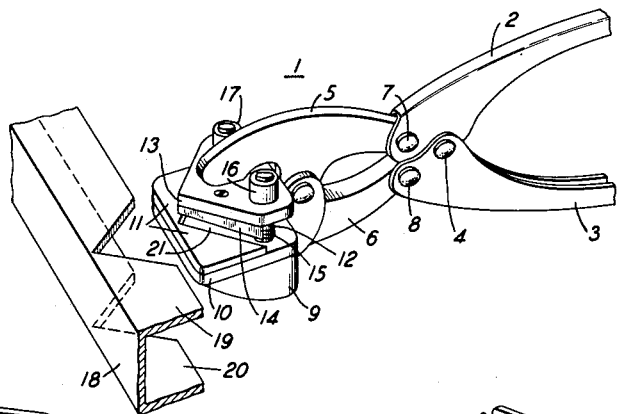
Fig. 1 is a perspective view of a section of channel type moulding and a metal cutting tool of the type adapted to cut notches therein.

Referring now to the drawing, Fig. 1 depicts a metal cutting tool 1 of the type known in the prior art with which the invention advantageously may be employed. A tool of this type, which is disclosed in the above-identified patent in greater detail, generally comprises a pair of arms 2 and 3 which may be hinged together at 4, a pair of operating members 5 and 6, connected to the arms 2 and 3 at 7 and 8 respectively, and a punch and die set carried by a base member 9 attached to the operating member 6. Base member 9 has a flat upper surface adapted to receive and hold a die plate 10 which bears a die 11. Die plate 10 also carries a pair of transversely spaced upright posts 12, of which one is shown in Fig. 1. A punch plate 13 having a punch 14 connected thereto is slidably positioned on the upright posts 12, the punch plate 13 normally being urged away from the die 11 by a pair of spring members 15 located around the upright posts 12 and compressible between the die plate 10 and the punch plate 13. The upper ends of the posts 12 are provided with nuts or caps 16 and 17 above the punch plate 13 for holding the punch plate in its upper position.

In the operation of the metal cutting tool, such as on the channel member 18 having an upper flange 19 and a lower flange 20, the flange to be cut is placed between the punch 14 and die 11 of the punch and die set and the arms 2 and 3 are brought together for moving the punch into operative relationship with the die. As the cutting edges of the punch 14 correspond to the edges of the die 11 a section having a shape corresponding to the punch and die set will be cut out of the flange. Preferably the die plate 10 has an aperture 21 therein, corresponding to the contour of the punch plate, through which the cuttings are discharged.

Figure 2:
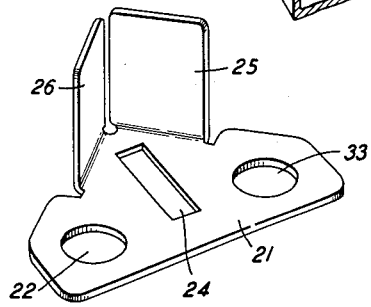
Fig. 2 is a perspective view of a guide adapted to be fitted to the metal cutting tool of Fig. 1 in accordance with the present invention.

As indicated above, it has been difficult in the prior art to cut the upper and lower flanges of the channel member in exact alignment to realize a perfect miter joint. In accordance with this invention, a guide is utilized with the cutting tool to effect this alignment. One embodiment of such a guide is shown in Fig. 2 of the drawing and comprises a base member 21 and a pair of positioning members 25 and 26 connected at right angles to the base members. Base member 21 has a pair of apertures 22 and 33 located therein for enabling the guide to be placed on and secured to the punch and die set of the cutting tool 1. Base member 21 also has a slot 24 therein to conform with the front portion of the operating member 5. Positioning members 25 and 26 define an included angle which corresponds to the shape of the cut to be made on the metal section. The guide easily may be attached to the metal cutting tool, such as by removing the punch and die set from the operating members 5 and 6, placing the guide over the punch plate 13 such that the upright posts 12 protrude through the apertures 22 and 23 and replacing the punch and die set between the operating members so that the lower front portion of operating member 5 rests in slot 24.

Figure 3:
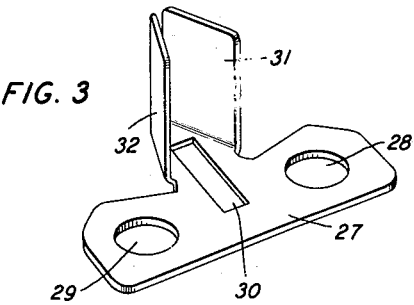
Fig. 3 is a perspective view of another embodiment of the guide shown in Fig. 2.

Fig. 3 shows another embodiment of the novel guide which is designed to be utilized with punch and die sets for making cuts of smaller angular dimensions. This guide essentially is similar to the guide of Fig. 2 and comprises a base member 27, a pair of apertures 28 and 29 located therein for attaching the guide to the punch and die set, a slot 30 for positioning the guide with respect to the upper operating member of the cutting tool, and a pair of angularly spaced positioning members 31 and 32 connected at right angles to base member 27. This guide member also may easily be attached to the cutting tool in the manner explained above.

Figs. 4 and 5 illustrate how the guide may be used with the cutting tool. In making the first cut on the upper flange 19 of the channel moulding, the guide is idle and the cut is made in the normal way, the flange 19 being placed between the cutting edges of punch 14 and die 11 of the punch and die set, as shown in Fig. 4. The operation of cutting tool 1 brings arms 5 and 6 together to move the punch into operative relationship with the die and a section having a shape corresponding to the punch and die set will be cut out of the flange 19. When the cutting tool is lowered to make a similar cut in the lower flange 20, the positioning members 25 and 26 of the guide fit snugly into the first cut in the upper flange and quickly locate the second cut so that it is in exact vertical alignment with the first.

This operation is shown more clearly in Fig. 5. It there can be seen that the positioning member 26 of the guide is fitted in the cut in the upper flange 19 so that the lower flange 20 is in proper position to be cut by punch 14 and die 11 of the cutting tool. Fig. 5 also shows more clearly the manner in which the guide base member 21 is positioned over the post 12 and nut 16 to rest on the punch plate 13 of the die.

While this invention has been disclosed in several particular embodiments for use with a specific type of cutting tool for the purposes of illustrating the principles of the invention, it will be appreciated by those skilled in the art that various modifications may be made in the shape of the guide and the manner in which it may be adapted to metal cutting tools to achieve the results of the invention. It will be understood that such modifications are intended to be within the spirit and scope of the appended claims.

What is claimed is:

1. In combination, a cutting tool of the type adapted to cut shaped sections on the upper and lower flanges of channel type work members, and guide means attachable thereto for enabling the upper and lower cuts to be made in precise alignment, said guide means comprising a plurality of aligning members disposed to conform with said shaped sections.

2. Guide means adapted to be attached to a cutting tool of the type utilized in cutting shaped sections in the flanges of channel type work members comprising a unitary structure including a base and a pair of positioning members connected at right angles to the base and defining an included angle therebetween, said included angle corresponding to said shaped sections cut from the work members.

3. Guide means in accordance with claim 2 wherein said base comprises means for enabling said guide means to be attached to said cutting tool.

4. Guide means in accordance with claim 2 wherein said base defines a plurality of apertures therein for enabling said guide means to be accurately positioned upon and attached to said cutting tool.

5. In combination, a cutting tool adapted to cut shaped sections in parallel positioned work members, and guide means for aligning the cuts in said work members comprising a base, said base having means for enabling said guide means to be attached to said cutting tool, and positioning means, said positioning means having a shape corresponding to said shaped metal sections and adapted to be fitted within the cut made in one of said parallel positioned work members for determining the location of the cut in the other of said work members.

6. Guide means adapted to be attached to a cutting tool of the type utilized in mitering shaped sections in channel type work members comprising a base having a plurality of apertures therein for enabling said guide means to be positioned upon and attached to said cutting tool, and a plurality of positioning members connected to said base and spaced relative to each other to correspond to the configuration of said shaped sections.

References Cited in the file of this patent

UNITED STATES PATENTS

| 1,002,710 | Kurzman | Sept. 5, 1911 |
| 1,907,000 | Parr | May 2, 1933 |
| 2,342,835 | Bray | Feb. 29, 1944 |
| 2,595,841 | Glick | May 6, 1952 |
| 2,613,740 | Drain | Oct. 14, 1952 |